US012587601B1

(12) United States Patent
Peevyhouse

(10) Patent No.: US 12,587,601 B1
(45) Date of Patent: Mar. 24, 2026

(54) SYSTEMS, APPARATUSES, AND METHODS FOR DISTRIBUTING EMERGENCY CALL CONTENT TO AN ECC FROM A REROUTED EMERGENCY CALL

(71) Applicant: RAPIDSOS, INC., New York, NY (US)

(72) Inventor: Jamison Peevyhouse, Martin, TN (US)

(73) Assignee: RAPIDSOS, INC., New York, NY (US)

(*) Notice: Subject to any disclaimer, the term of this patent is extended or adjusted under 35 U.S.C. 154(b) by 0 days.

(21) Appl. No.: 19/253,925

(22) Filed: Jun. 29, 2025

Related U.S. Application Data

(60) Provisional application No. 63/787,491, filed on Apr. 11, 2025.

(51) Int. Cl.
 *H04M 3/51* (2006.01)
 *H04W 4/90* (2018.01)
(52) U.S. Cl.
 CPC ....... *H04M 3/5116* (2013.01); *H04M 3/5183* (2013.01); *H04W 4/90* (2018.02)

(58) Field of Classification Search
 CPC ..... H04M 3/5116; H04M 3/5183; H04W 4/90
 See application file for complete search history.

(56) References Cited

U.S. PATENT DOCUMENTS

| | | | | |
|---|---|---|---|---|
| 9,641,679 | B1* | 5/2017 | Shepard | H04M 3/42348 |
| 11,330,104 | B1* | 5/2022 | Pappas | H04L 65/1069 |
| 11,637,923 | B1* | 4/2023 | Manzanillo | G06F 16/90332 |
| | | | | 455/404.2 |
| 11,696,108 | B2 | 7/2023 | Ekl et al. | |
| 2021/0306836 | A1* | 9/2021 | Ekl | H04W 4/02 |
| 2023/0397087 | A1* | 12/2023 | Talasila | H04W 40/248 |
| 2024/0098473 | A1* | 3/2024 | Ingram | H04M 3/42348 |

* cited by examiner

*Primary Examiner* — Stella L. Woo
(74) *Attorney, Agent, or Firm* — Cygan Law Offices PC; Joseph T. Cygan

(57) ABSTRACT

A disclosed method includes: receiving, by a cloud server, emergency data from a mobile device that placed an emergency call; determining that the mobile device is located within the jurisdiction of a first ECC, in response to receiving the emergency data; determining that the emergency call has been rerouted to a second ECC; and notifying the first ECC that the emergency call was rerouted to the second ECC.

20 Claims, 5 Drawing Sheets

ECC A

ECC HAVING JURISDICTION/LOCATION BASED ON EMERGENCY CALLER LOCATION

ECC B

ECC TO WHICH EMERGENCY CALL WAS ROUTED (DUE TO REROUTING, MISROUTING, NETWORK OUTAGES, ETC.)

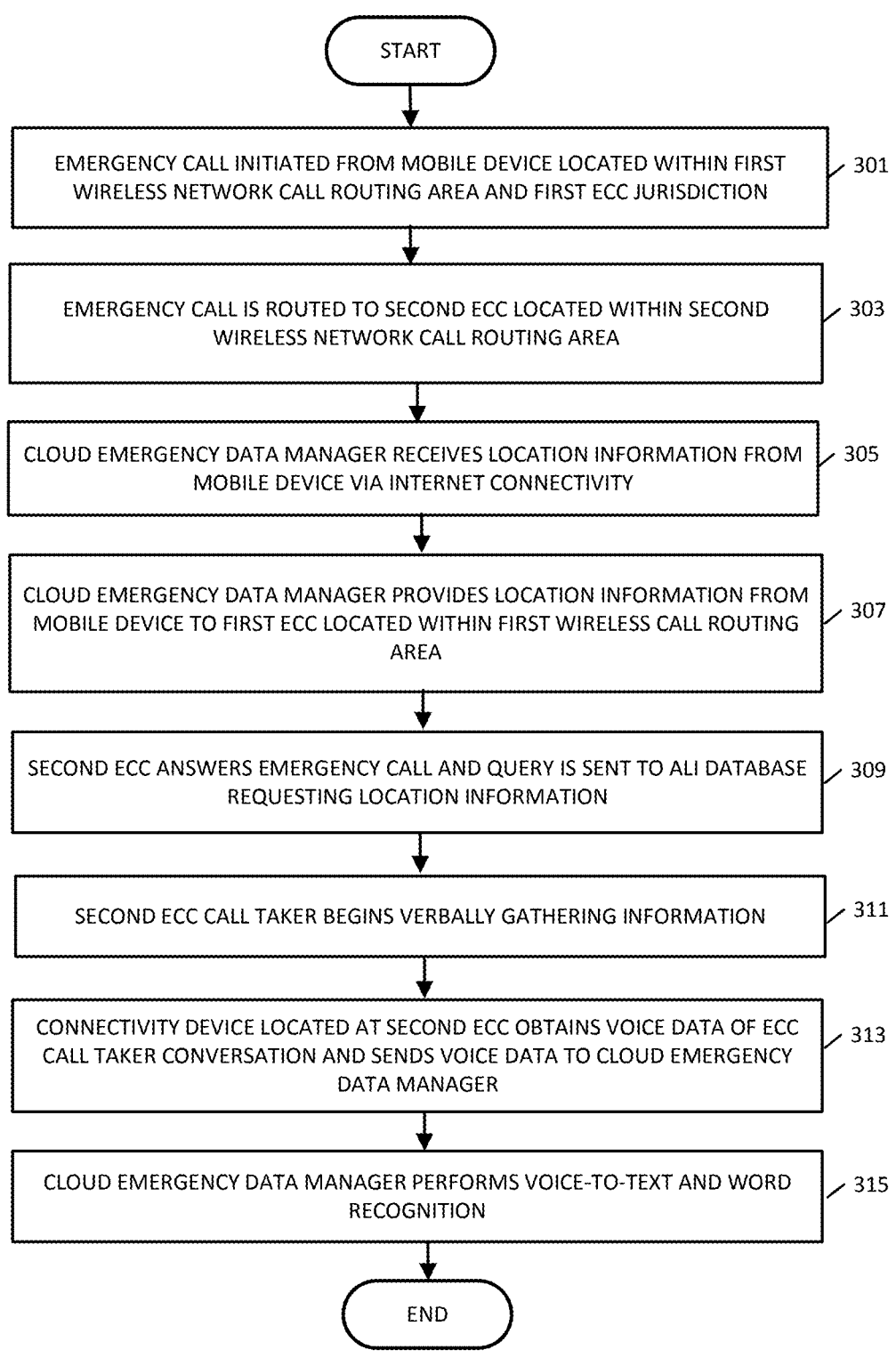

START

EMERGENCY CALL INITIATED FROM MOBILE DEVICE LOCATED WITHIN FIRST
WIRELESS NETWORK CALL ROUTING AREA AND FIRST ECC JURISDICTION          301

EMERGENCY CALL IS ROUTED TO SECOND ECC LOCATED WITHIN SECOND
WIRELESS NETWORK CALL ROUTING AREA          303

CLOUD EMERGENCY DATA MANAGER RECEIVES LOCATION INFORMATION FROM
MOBILE DEVICE VIA INTERNET CONNECTIVITY          305

CLOUD EMERGENCY DATA MANAGER PROVIDES LOCATION INFORMATION FROM
MOBILE DEVICE TO FIRST ECC LOCATED WITHIN FIRST WIRELESS CALL ROUTING
AREA          307

SECOND ECC ANSWERS EMERGENCY CALL AND QUERY IS SENT TO ALI DATABASE
REQUESTING LOCATION INFORMATION          309

SECOND ECC CALL TAKER BEGINS VERBALLY GATHERING INFORMATION          311

CONNECTIVITY DEVICE LOCATED AT SECOND ECC OBTAINS VOICE DATA OF ECC
CALL TAKER CONVERSATION AND SENDS VOICE DATA TO CLOUD EMERGENCY
DATA MANAGER          313

CLOUD EMERGENCY DATA MANAGER PERFORMS VOICE-TO-TEXT AND WORD
RECOGNITION          315

END

*FIG. 3*

SYSTEMS, APPARATUSES, AND METHODS FOR DISTRIBUTING EMERGENCY CALL CONTENT TO AN ECC FROM A REROUTED EMERGENCY CALL

CROSS-REFERENCE TO RELATED APPLICATIONS

The present application claims priority to U.S. Provisional Patent Application No. 63/787,491, filed Apr. 11, 2025, entitled "SYSTEMS AND METHODS FOR DISTRIBUTING EMERGENCY CALL CONTENT TO AN ECC FROM A MISROUTED EMERGENCY CALL" which is hereby incorporated by reference herein in its entirety, and which is assigned to the same assignee as the present application.

FIELD OF THE DISCLOSURE

The present disclosure relates generally to emergency communications centers (ECC), such as a Public Safety Answering Point (PSAP), Next Generation 9-1-1 systems, and more particularly to methods and apparatuses for providing emergency data to an ECC during emergency calls.

BACKGROUND

Wireless communications systems include base-transceiver stations (BTS) located and positioned to provide radio coverage to given geographical areas in which they are located. A BTS is associated with an antenna tower with each tower typically having an antenna array with at least three antennas each having a 120° beam width and usually positioned to provide a 360° coverage for a given geographical area. These antenna towers are often referred to as "cell towers" or "cellular towers." Mobile devices connect to one or more BTS, via respective BTS antenna towers, in order to place and receive telephone calls via these wireless communications systems. In legacy wireless communications systems, the BTS is connected via backhaul connections to a Mobile Switching Center (MSC) and possibly to a base station controller (BSC) or the like, in which multiple BSCs may be connected to an MSC. In this case multiple BTS may be connected to a BSC and multiple BSCs may be connected to an MSC. The MSC geographically is associated with a call routing area similar to legacy landline telephony systems (i.e. switch areas). A legacy BSC may also be associated with a call routing area.

Emergency communications centers (ECCs) such as, a Public Safety Answering Point (PSAP), are located within these call routing areas. An ECC typically has jurisdiction over the geographical area in which it is located. However, the jurisdictional boundaries and the call routing areas may not exactly align among other issues. Mobile devices normally camp on a BTS having the strongest radio frequency (RF) signal perceived by the mobile device at its location. This BTS at that time may be referred to as the "best server" for the mobile device. The mobile device maintains a neighbor list of surrounding BTS in addition to the best server, so that the mobile device has BTS candidates for handovers as the mobile device changes locations. Although wireless communications systems are designed so that each BTS provides RF coverage to a given area, and is within a given BSC area or MSC area, RF naturally cannot be completely geographically limited or controlled and therefore RF coverage can, and normally does, extend beyond the intended boundaries of coverage.

When an emergency call is placed by a mobile device, the call becomes associated with the mobile device best server at the time the emergency call is placed. From the standpoint of emergency call routing, the emergency call will be routed to whichever ECC is located within the switching area of the best server BTS. In other words, whichever ECC is located in the MSC area of the MSC to which the best server BTS is connected by backhaul, will receive the emergency call. However, the mobile device placing the emergency call may be physically located in a different MSC area, corresponding to a different ECC jurisdiction. In this situation, the ECC receiving the emergency call is not the ECC having jurisdiction, or even being close enough in proximity, to respond to the emergency, which wastes valuable and critical time in dispatching responders.

BRIEF DESCRIPTION OF THE DRAWINGS

FIG. 3 is a flowchart of a method of operation of an EDMS for handling a rerouted emergency call from a mobile device in accordance with an embodiment corresponding to FIG. 2.

DETAILED DESCRIPTION

Figure 1:
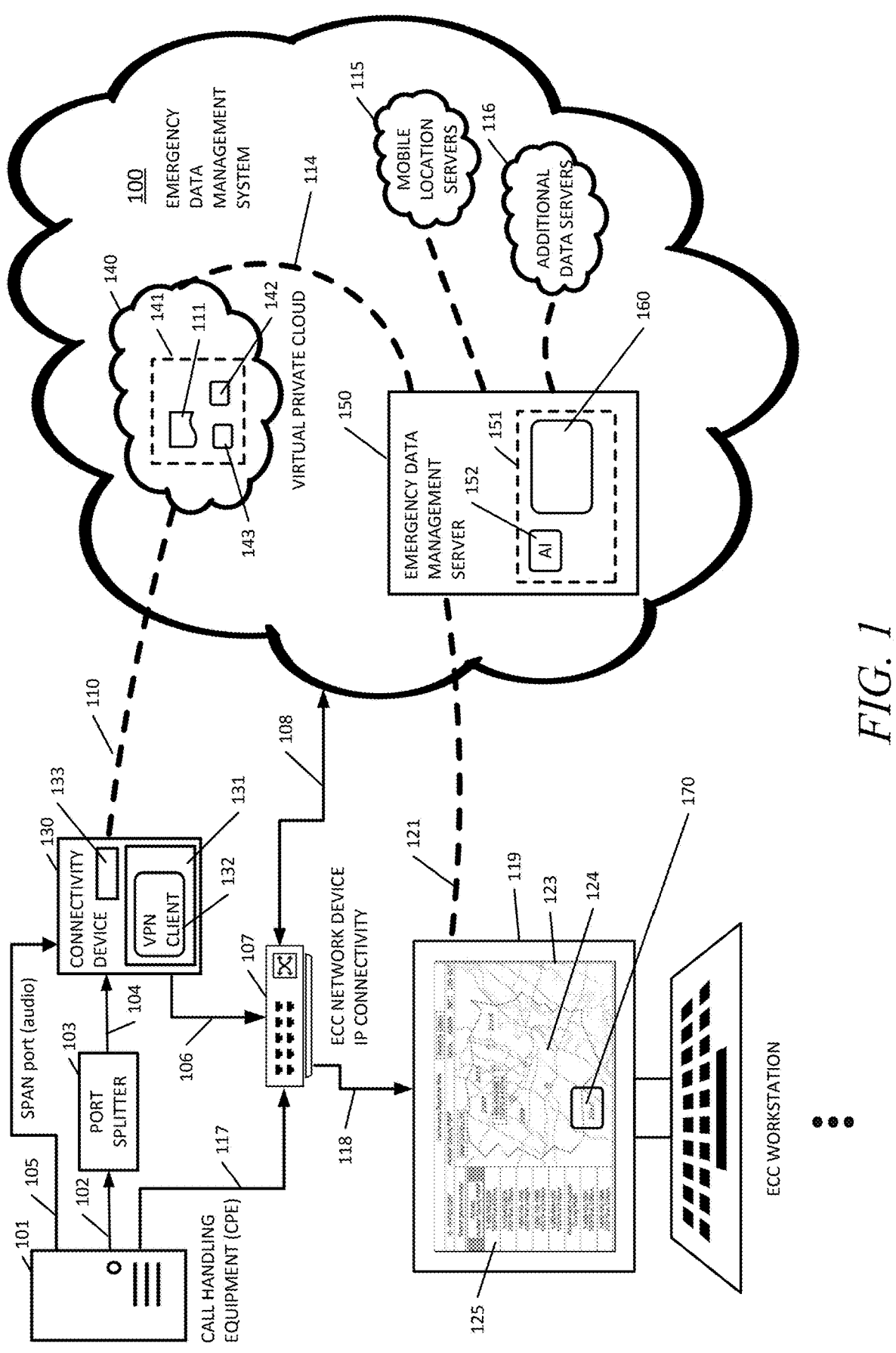
FIG. 1 is a diagram of a cloud-based, software-as-a-service (SaaS) Emergency Data Management System (EDMS) in communication with an Emergency Communication Center (ECC) where the EDMS provides a cloud application to the ECC. The ECC may be a Public Safety Answering Point (PSAP).

Briefly, the present disclosure provides a cloud-based system operative to handle rerouted emergency calls by notifying an emergency communication center having authority over an emergency that an emergency call was rerouted to an alternative emergency communication center. The system also informs the alternative emergency communication center of the rerouting and of the emergency communication center having jurisdictional authority over the emergency, based on the caller's actual location. The apparatuses, systems, and methods described herein are useful during network outages and natural disasters, or for multi-agency coordination, in accordance with embodiments of the disclosure.

A call may be rerouted to an alternative ECC for a variety of reasons. An initially intended ECC may experience call disruption due to a cybersecurity attack, a disaster (e.g., a hurricane), a default routing (e.g., that is incorrectly mapped), and a true misroute (e.g., possibly caused by wireless tower call handling), for example. A reroute of a 911 call due to disaster or cybersecurity disruption may be intentional and appropriate, even though the alternative ECC receiving the call isn't the ECC intended by the 911 caller. Some rerouted calls may be classified as an alternate route, a default route, an MSC trunk alternate route, selective routing (e.g., based on time of day, planned outages, unplanned outages, etc.). At times, a call may be misrouted, but significantly more scenarios exist for a call being intentionally routed to an alternative and appropriate ECC. The technologies of the present disclosure may cover both scenarios.

A disclosed method involves: receiving, by a cloud server, emergency data from a mobile device that placed an emergency call; determining that the mobile device is located within the jurisdiction of a first ECC, in response to receiving the emergency data; determining that the emergency call has been rerouted to a second ECC; and notifying the first ECC that the emergency call was rerouted to the second ECC.

The method may further involve notifying the second ECC that the emergency call was placed from within the jurisdictional boundaries of the first ECC. The method may further involve receiving mobile device identification data from the second ECC for the mobile device; and determining that the emergency call has been rerouted to the second ECC in response to receiving the mobile device identification data from the second ECC for the mobile device. The method may further involve receiving audio data corresponding to the emergency call received at the second ECC. The method may further involve producing a transcript of the emergency call by performing speech-to-text conversion of the audio data corresponding to the emergency call received at the second ECC; and providing the transcript to the first ECC. The method may further involve receiving audio data corresponding to the emergency call received at the second ECC, in response to receiving mobile device identification data from the second ECC for the mobile device. The method may further involve receiving mobile device identification data from the second ECC for the mobile device, by obtaining ANI/ALI (Automatic Number Identification/Automatic Location Identification) data via a connection between a connectivity device located at the second ECC and an ECC functional element of the second ECC; and sending the ANI/ALI data to the cloud server from the connectivity device. The method may further involve notifying the second ECC that the emergency call was placed from within the jurisdictional boundaries of the first ECC, by providing identification information for the first ECC to the second ECC. The method may further involve notifying the first ECC that the emergency call was rerouted to the second ECC, by providing identification information for the second ECC to the first ECC.

Another disclosed method involves: receiving, by a cloud server, emergency data from a mobile device that placed an emergency call using a wireless telecommunication network; notifying an ECC that the emergency call was placed from within the jurisdictional boundaries of the ECC; determining that the emergency call has not been routed to the ECC or any other ECC by the wireless telecommunication network; and notifying the ECC that the emergency call was not routed. The method may further involve determining that the mobile device is located within the jurisdiction of a first ECC, in response to receiving the emergency data.

A disclosed system includes a cloud server, operative to establish a connection with at least two emergency communication centers (ECCs). The cloud server has at least one process and non-volatile, non-transitory memory, operatively coupled to the processor. The processor is operative to: receive emergency data from a mobile device that placed an emergency call; determine that the mobile device is located within a jurisdiction of a first ECC, in response to receiving the emergency data; determine that the emergency call has been rerouted to a second ECC; and notify the first ECC that the emergency call was rerouted to the second ECC (e.g., incorrectly routed and/or default routed due to network disruption).

The system may further include a connectivity device, with at least one processor and a non-volatile, non-transitory memory, operatively coupled to the processor. The connectivity device is located at an emergency communication center (ECC), and is operatively coupled to an ECC functional element, and to the cloud server. The connectivity device is operative to receive ECC emergency data from the ECC functional element and send the emergency data to the cloud server.

The processor of the cloud server may be further operative to: notify the second ECC that the emergency call was placed from within the jurisdictional boundaries of the first ECC. The processor may be further operative to: receive mobile device identification data from the second ECC for the mobile device; and determine that the emergency call has been rerouted to the second ECC in response to receiving the mobile device identification data from the second ECC for the mobile device. The processor may be further operative to receive audio data corresponding to the emergency call received at the second ECC. The processor may be further operative to produce a transcript of the emergency call by performing speech-to-text conversion of the audio data corresponding to the emergency call received at the second ECC; and provide the transcript to the first ECC. The processor may be further operative to provide inter-agency chat and sharing/requesting of resources. The processor may be further operative to receive audio data corresponding to the emergency call received at the second ECC, in response to receiving mobile device identification data from the second ECC for the mobile device.

The system may include a connectivity device, that has at least one processor and a non-volatile, non-transitory memory, operatively coupled to the processor. The connectivity device is located at an emergency communication center (ECC), and is operatively coupled to an ECC functional element, and to the cloud server. The connectivity device is operative to receive the mobile device identification data from the second ECC for the mobile device, by obtaining ANI/ALI (Automatic Number Identification/Automatic Location Identification) data via a connection between the connectivity device located at the second ECC and an ECC functional element of the second ECC; and send the ANI/ALI data to the cloud server.

The cloud server processor may be further operative to notify the second ECC that the emergency call was placed from within the jurisdictional boundaries of the first ECC, by providing identification information for the first ECC to the second ECC. The processor may be further operative to notify the first ECC that the emergency call was rerouted to the second ECC (e.g. incorrectly or appropriately due to network disruption), by providing identification information for the second ECC to the first ECC.

Another disclosed system has a cloud server, operative to establish a connection with at least two emergency communication centers (ECCs). The cloud server has at least one process and non-volatile, non-transitory memory, operatively coupled to the processor. The processor is operative to: receive emergency data from a mobile device that placed an emergency call using a wireless telecommunication network; notify an ECC that the emergency call was placed from within the jurisdictional boundaries of the ECC; determine that the emergency call has not been routed to the ECC or any other ECC by the wireless telecommunication network; and notify the ECC that the emergency call was not routed. The processor may be further operative to determine that the mobile device is located within the jurisdiction of a first ECC, in response to receiving the emergency data.

Turning now to the drawings wherein like numerals represent like components, FIG. 1 is a diagram of an Emergency Communication Center (ECC) that is in communication with a cloud-based, software-as-a-service (SaaS) emergency data management system (EDMS 100) that that includes an emergency data management server (EDM server 150), in accordance with an embodiment. The ECC may be a Public Safety Answering Point (PSAP). The ECC includes Customer Premises Equipment (CPE) 101 which is a set of communications or terminal equipment located in the ECC or PSAP facilities. In telecommunications, the acronym "CPE" may be defined as "customer-premises equipment" or "customer-provided equipment" and refers to any terminal and associated equipment located at a telephone system subscriber's premises and connected with a telephone carrier's telecommunication circuits at a demarcation point. The demarcation point established in a building or complex, or some specific location, separates the specific customer equipment (i.e. the ECC or PSAP equipment) from other equipment located in either the distribution infrastructure or central office of the communications service provider (such as a telephone carrier).

Examples of equipment that may be included in a CPE may include, but are not limited to, active equipment and devices such as telephones, routers, network switches, gateways, networking adapters and Internet access gateways that enable the ECC to access communication services and distribute them within an ECC local area network (LAN); or passive equipment such as analogue telephone adapters (ATA) or xDSL-splitters, including various telephone systems, private branch exchanges (PBXs) etc. Some of this equipment may be devices purchased by the ECC, however some may be provided by one or more service providers that provide telecommunications or other services to the ECC. The ECC CPE may have one or more racks or chassis to encase and hold the CPE equipment and to enable cabling and interconnection via various CPE-peripherals.

One specific example equipment in an ECC CPE is an Automatic Number Identification Controller (ANI Controller) which is defined by NENA as a "stand-alone CPE component which provides the ANI decoding and function key control for 9-1-1 service." The ANI (Automatic Number Identification) refers to a telephone number (i.e. a "caller ID") associated with the access line from which a call originates, and in legacy trunked telephony lines is transmitted to an ECC on a sideband channel transmitted on a trunked line. Assuming the system is operating properly, the ECC receives an ANI number associated with a 9-1-1 emergency call as it arrives.

Procedurally, an ECC then sends an "ALI Request" which is defined by NENA as a "query for an ALI record sent from the PSAP to the ALI database." The ECC or PSAP may also perform "ALI Retrieval" which NENA defines as "the process by which a PSAP queries an ALI database with an ALI Request and receives a response with location and other available information." The term "ALI" (Automatic Location Identification) is defined by NENA as "the automatic display at the PSAP of the caller's telephone number, the address/location of the telephone and supplementary emergency services information of the location from which a call originates." The ANI and ALI data collectively may be referred to a "ANI/ALI" data (i.e. "ANI" Automatic Number Identification and "ALI" Automatic Location Identification).

The ECC also includes "call handling" which NENA defines as "a functional element concerned with the details of the management of calls." According to NENA, call handling handles all communication from the caller and includes the interfaces, devices and applications utilized to handle the call. A "functional element" or "functional entity" is defined by NENA as "a set of software features that may be combined with hardware interfaces and operations on those interfaces to accomplish a defined task." The ECC includes an APU (Answering Position Unit) which is defined by NENA as "a term used to define call-taking equipment." The ECC workstation 119 shown in FIG. 1 may be referred to as an APU and is operatively coupled to the ECC LAN via connection 118 to the ECC network device 107. The ECC network device 107 may be, for example, a network switch or a router connected to backhaul 108 such as, for example, one or more T1 telecommunications lines or the like to provide Internet access and telephone network access to the ECC. The ECC network device 107 may be located within a rack of the CPE 101. Depending on the size of the ECC, multiple APUs such as ECC workstation 119 may be present at the ECC with each one operatively coupled to the ECC LAN and the Internet via a network connection 118 to the ECC network device 107 or to an internal ECC LAN switch or router, etc. Additionally, there may be separate APUs for call handling and CAD (computer-aided-dispatch), or call handling and CAD software systems may be operating together on a single APU such as ECC workstation 119.

Calls received by the ECC come into the ECC via the CPE 101 and are internally switched or routed to an ECC workstation 119 (i.e. an APU) as appropriate per the specific ECC call handling operational procedures implemented by the CPE 101 and any intermediary call handling. The term "call" as used herein comports with the NENA definition as "a generic term used to include any type of Request For Emergency Assistance (RFEA); and is not limited to voice." Therefore, the term "call" may include a session established by signaling with two-way real-time media and involves a human making a request for help." The terms "voice call", "video call" or "text call" are used herein when the specific media is of significance. As per NENA definitions, the term "call" may refer to either a "voice call", "video call", "text call" or "data-only call", since they are handled the same way through most of NG9-1-1."

In the embodiment example shown in FIG. 1, a functional element of the CPE 101 is operatively coupled to a connectivity device 130. The connectivity device 130 includes several connection ports such that the connectivity device 130 is operative to connect to multiple functional elements. In some implementations, a port splitter may be employed, to enable a functional element to connect to multiple devices. In one example implementation of the FIG. 1 configuration, the functional element output may be connected to a port splitter 103 via a serial connection 102. Serial connection 102 may be a DB 9 or DB 25 type connection. A serial connection 104 may then be made between the port splitter 103 and the connectivity device 130 such that the serial connection 104 provides a serial data input to the connectivity device 130. In some embodiments, the functional element may be ANI Controller. In another embodiment the functional element may be an ANI Controller that is integrated into a call handling functional element. In yet another embodiment, the functional element may be an ANI modem bank that is operatively coupled to either a standalone ANI Controller or to an ANI Controller that is integrated into a call handling functional element. In any of these various implementations, the ANI Controller, whether standalone or integrated, and/or the ANI modem bank, may have a limited number of available serial ports. Therefore, the port splitter 103 may be used when needed to accommodate providing one or more additional serial ports. Therefore, in some embodiments the serial port splitter 103 may not be required. Also, in some embodiments, the connectivity device 130 may have available network ports, such as an Ethernet port, and may connect to one or more functional elements via a network port rather than a serial port to establish IP connections (TCP/UDP).

Call handling may be operatively coupled to the connectivity device 130 as a functional element of the CPE 101 via a Switched Port Analyzer port (SPAN port 105) to provide audio data to the connectivity device 130, and may be connected via an Ethernet port. In the case of ANI/ALI data, either the port splitter 103 or an ANI Controller, Functional Element, etc., directly, provide a serial connection 104 for a serial data input to the connectivity device 130 which is operative to receive serialized data and convert it to packetized data for transmission over the Internet. The serial connection 104 may be a DB 9, a DB 25, or a USB connection. The connectivity device 130 is operatively coupled to the ECC network device 107 via a connection 106 which may be, for example an Ethernet cable. The ECC network device 107 is coupled to and provides the backhaul 108 connections to the Internet. In some embodiments, the connectivity device 130 may connect to the functional entity, related to receiving ANI/ALI data, via an IP connection (i.e. using an Ethernet cable connection to an Ethernet port). In some embodiments, the connectivity device 130 may connect to aspects of the 9-1-1 network (at the trunk or SIP/IP) connection that are upstream of an ECC and/or that are hosted core services. In some embodiments, the EDMS 100 may be operatively coupled to a functional element within a Next Generation 9-1-1 (NG911) network such as within an Emergency Services IP Network (ESInet). In some embodiments, the operative coupling may include another network connectivity device, alternative to or in addition to connectivity device 130, where the network connectivity device is either a function element within the ESInet, or alternatively is operatively coupled to a functional element within the ESInet and is operative to obtain trunked telecommunications network data or Session Initiation Protocol (SIP/IP/VOIP) data including audio data and associated metadata.

The connectivity device 130 includes at least one processor 131, and non-volatile, non-transitory memory 133 that is operative coupled to the processor 131. The connectivity device 130 is operative to establish an IP connection 110 with the emergency data management system 100 (EDMS 100). In some embodiments, the memory 133 may include software operative to implement a virtual private network (VPN) client (VPN client 132) and to establish a VPN connection, over IP connection 110, with a virtual private cloud (VPC) network 140 associated with the cloud-based emergency data management system 100. In some embodiments, the VPN client 132 may be stored in the memory 133 as executable code. Further, an authentication procedure, authentication tokens and login credentials may also be stored in memory 133. In some embodiments, object-oriented programming code may be stored for execution by the processor 131.

In some embodiments, the EDMS 100 may include one or more VPC (virtual private cloud) networks 140 which are virtual networks with each virtual network being operatively coupled via network coupling 114, to the EDM server 150 and dedicated to the use of a single ECC within the public cloud computing environment of the internet. A VPC network 140 may be used to provide the ECC with a high level of isolation from other ECCs accessing the emergency data management system 100 and also provide the ability to customize the network configuration to meet the ECC specific requirements. Therefore, a VPC network 140 can be used to host resources such as virtual machines, storage systems, and other resources, and allow the ECC to have a customized network environment within the public cloud, including the ability to create subnets, define network access controls, and configure security measures, while also providing the benefits of a public cloud such as scalability and flexibility while enabling the ECC to maintain a private and secure network environment.

In some embodiments, a VPN connection is established as a client-server configuration where the connectivity device 130 executes a VPN client 132 on processor 131 and a VPC network 140 of the emergency data management system 100 implements a VPN server having at least one processor 141, which may be a distributed processor. However, in other embodiments, a VPN may be implemented as a clientless VPN.

In the embodiments employing a client-server VPN implementation, the connectivity device 130 is operative to store executable code for the VPN client 132 in onboard memory 133 and to execute the VPN client 132 on processor 131 such that, upon establishing a connection to the Internet (using the backhaul 108 and IP connection 110), the VPN client 132 will initiate and establish a VPN connection with the VPC network 140 and the EDMS 100. The VPN client 132 sends data through the IP connection 110, via a VPN connection to a VPN server in the VPC network 140 which receives and processes the data on behalf of the VPN client 132. The VPN client 132 and VPN server then work together to create a secure and encrypted connection VPN connection (over IP connection 110) between the connectivity device 130 and the VPC network 140. The connectivity device 130 may then send data to a data endpoint within the VPC network 140 such as ANI/ALI data, call handling audio data, or other ECC data, etc.

A VPC may include an identification and authentication function which provides an authenticated and labeled output to a data endpoint. In some embodiments, the identification and authentication function is program logic operative to add an ECC identifier to packet data received over a VPN connection from the connectivity device 130, and to perform an authentication process to reliably identify the ECC and a data endpoint which is an entity requesting access data or services. A VPC network 140 may be operative to implement a VPN server from the perspective of the connectivity device 130 which implements the VPN client 132.

Regardless of whether or not a VPN is utilized, the connectivity device 130 sends data to the EDMS 100 with an ECC identifier such that the EDM server 150 can identity to which ECC received data is associated. In the various embodiments, an ECC identifier may be a unique identifier, or may include, or be a combination of, various source and destination variables such as, but not limited to, a Media Access Control (MAC) address, an IP address, a port number, an Ethernet frame, a network device identifier, hostname or domain name, etc. The ECC identifier, or components thereof, may be obtained partially or fully from the connectivity device 130 (such as its MAC address), an ANI Controller, or another functional entity in the ECC CPE or may be another unique identifier unique to the ECC.

For example, a MAC address assigned to a network interface on a device such as the connectivity device 130, an ANI Controller, or another functional entity in the ECC CPE may be used. The MAC addresses may be 48 bits long expressed as a series of hexadecimal digits, separated by colons or hyphens. In another example, an IP address assigned to a device that is connected to the Internet such as, but not limited to, the connectivity device 130, an ANI Controller, or another functional entity in the ECC CPE may be used. An example IPv4 address is 32 bits long, expressed as a series of four decimal numbers, separated by dots, while an example IPv6 address is 128 bits long, expressed as a series of eight hexadecimal numbers, separated by colons. In another example, a port number is a 16-bit identifier that is used to identify a specific process or service on a device such as, but not limited to, the connectivity device, an ANI Controller, or another functional entity in the ECC CPE. The port numbers may be used in, as in IP networking practice, in combination with IP addresses to identify the endpoints of a communication session over a VPN connection. In another example, an Ethernet frame may be used where the Ethernet frame is a data packet used to transmit data over the ECC local area network (LAN). In this example, the Ethernet frame has a header that includes a destination MAC address of 48 bits length and a source MAC address of 48 bits length for a total of 96 bits length. In another example, a network device identifier of the connectivity device 130, an ANI Controller, or another functional entity in the ECC CPE may be used. These example network device identifiers are similar to the network device identifiers of devices such as switches and routers, etc. The length of these identifiers may vary, but they are at least 32 bits long. As noted above, the ECC identifier may be a combination of any of these examples and may either be, or include some other unique identification data.

The EDMS 100 may utilize a data endpoint which is an API endpoint and may be considered as the end of a communication channel between a functional element at the CPE 101 and a VPC network 140. As mentioned above, the functional element may be an ANI Controller, call handling SPAN port, etc. In that context, the data endpoint may be considered an API (application programming interface) endpoint which enables the connectivity device 130 to communicate with the VPC network 140. For example, a data endpoint, via an API, may request resources from the connectivity device 130 over the IP connection 110. In various embodiments, multiple ECCs communicate with the EDMS 100 to send and receive data and each ECC is identified via its unique identifier related to its connectivity device 130, which as discussed above, is installed locally at the ECC premises (i.e. on-site device) or within functional elements of the 9-1-1 network (e.g., at the host node). The connectivity device 130 is operative to attach or insert the ECC identifier to data sent to the EDMS 100.

In one example embodiment, the processor 141 is operative to execute an audio codec 143 for coding-decoding audio packets received from the connectivity device 130 via the SPAN port 105. The processor 141 is also operative to execute a voice processing module 142 which can perform speech-to-text conversion to convert audio data packet received from the connectivity device 130 to produce a transcript 111. The transcript 111 is provided to the EDM server 150 which in turn provides the transcript to one or more ECCs.

In various embodiments, the EDMS 100 may include one or more virtual servers, hardware servers, etc. as required to provide a SaaS (software-as-a-service) capability to the various ECCs such as a cloud-based application 160. The EDMS 100 provides a web portal graphical user interface (GUI), EDMS GUI 123, to one or more ECC workstations

119 of multiple ECCs. Each EDMS GUI 123 executed on an ECC workstation corresponds to an instance of the cloud-based application 160 provided by the EDMS 100. The cloud-based application 160 instance may be run in a browser executed by the workstation 119 and using a web socket connection over an IP connection 121. The web socket connection may be established as a persistent connection and run over the top of a TCP (Transmission Control Protocol) connection. The cloud-based application 160 is executed by a processor 151 of the EDMS 100. The processor 151 may be a distributed processor in some embodiments. The processor 151 is also operative to execute an artificial intelligence (AI) module 152, which may include a language model such as, a small language model, a large language model, or the like, etc.

In some embodiments, the processor 151 is operative to execute the audio codec 143 and is also operative to execute the voice processing module 142. In such embodiments, the EDM server 150 produces the transcript 111 directly. The transcripts are provided to one or more ECCs by the EDM server 150 via each ECC's respective EDMS GUI 123.

The EDMS GUI 123 provides a map view 124 with location indicators and other data corresponding to emergency calls directed to the ECC, whether call routing is completed or not, and whether the call routing is to the correct ECC or not (e.g. "correct" based on the actual location of the caller within a given ECC jurisdictional area), and a call queue 125 with ANI (called ID) data for each call, in addition to other data such as ADR (additional data repository) data, medical data, etc. from the additional data servers 116. The map view 124 also includes emergency data 170, obtained by the connectivity device 130 from an ECC functional element, and sent to the EDMS 100, in accordance with an embodiment.

The data 170 may also be related to an emergency call that was routed to an alternative ECC, i.e. an ECC that didn't have jurisdiction for the actual location from where the caller is located. The EDMS 100 is operative to receive mobile device location data, and other emergency data, from various mobile location servers 115 and from additional data servers 116. The mobile device location data is device-based hybrid location data which is generated by the mobile device and may include GPS, device calculated location, etc. The mobile location servers 115 receive hybrid location data from mobile devices via Internet connectivity to the mobile devices, and the data may include for example, but are not limited to, Android Mobile Location (AML) data, Android Emergency Location Service (ELS) data, and Hybridized Emergency Location (HELO) data provided by iOS™ devices, and other mobile device location data, etc. In some embodiments, the EDMS 100 uses the data from a cloud-based data endpoint to identify emergency location data and other data associated with device identifiers (i.e. ANI/ALI data) and can match up data from the cloud-based data endpoint with other available emergency data to provide more complete and accurate information to the ECCs. The match up of cloud-based data endpoint data with data received by the EDMS 100 enables identification of emergency calls that have been routed to the ECC via telephony routing including calls that were rerouted. However, the EDMS 100 information is not limited to emergency calls that have been routed to the ECC and the data obtained from the mobile location servers 115, and additional data servers 116 can be obtained by the EDMS 100 and provided to the EDMS GUI 123 prior to the ECC receiving and answering the call, and can be provided during network disruptions (e.g., a wired/wireless 9-1-1 network outage, cybersecurity attack, natural disasters, or the like, etc.). Therefore, EDMS 100 is operative to provide an emergency call queue 125 and a map view 124 on the EDMS GUI 123 that shows location indicators for devices from which emergency calls have emanated, within an ECC's jurisdictional area, even before completion of the emergency call routing to the ECC, and even if the call was routed to an alternative ECC.

The EDMS 100 may also determine which ECC should receive what data based on related mobile device location and whether a specific device that placed a call is located within an ECC geofence specified in a geofence database. Alternatively, where an ECC may not have a specified geofence in the geofence database, the EDMS 100 may use a reference source such as, but not limited to, a NENA PSAP Database Tool, for example the Enhanced Public Safety Answering Point (PSAP) Registry and Census (EPRC), which is a secure web-based tool that was developed in 2019 and which contains information for PSAPs throughout the United States. In other words, when emergency calls are placed by mobile devices, the EDMS 100 receives mobile device location data, and other emergency data, and has knowledge of which ECC has jurisdiction over the emergency response based on knowing the actual location of the mobile device used to place the emergency call.

Figure 2:
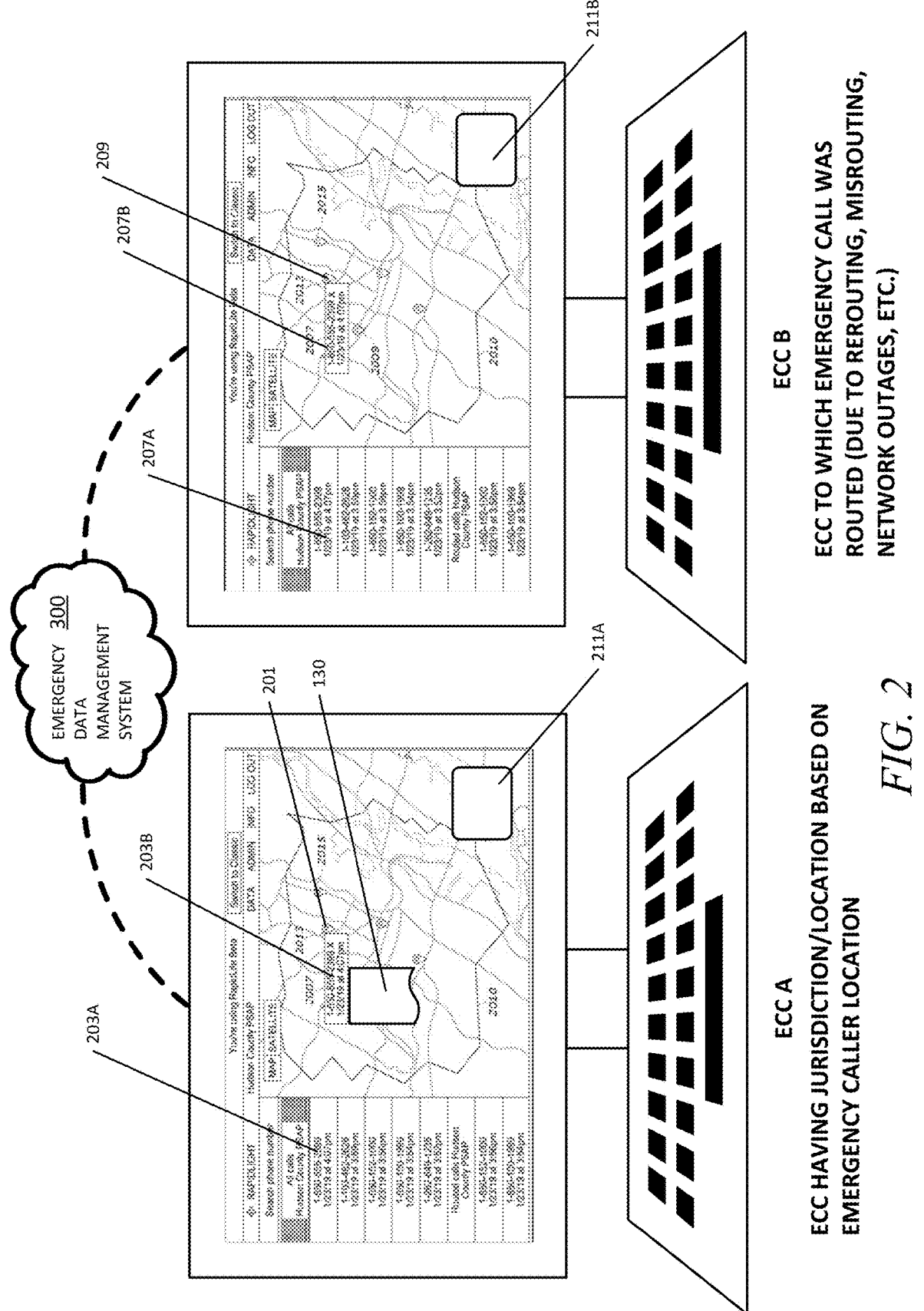
FIG. 2 is a diagram of a first ECC and a second ECC, both in communication with the EDMS and having the cloud application, and in a situation where an emergency call from a mobile device is routed to an alternative ECC by the wireless network or the 9-1-1 network.

FIG. 2 is a diagram illustrating a scenario in which a mobile device places an emergency call, but the call is routed to an alternative ECC (ECC B). This can occur for a number of reasons, one reason being default or selective routing due to disaster (i.e., an unplanned disruption) or network maintenance (i.e., a planned disruption). Another reason being that the cellular tower providing RF coverage to the mobile device is physically located in an MSC switching area associated with the ECC to which the call is routed. In the example shown in FIG. 2, an emergency call is placed from a mobile device having the telephone number 650-555-2399.

The mobile device is located in the jurisdictional area of ECC A. However, the wireless network alternatively routes the call (e.g. reroutes) to ECC B based on the cellular tower location or due to ECC A being offline from the 9-1-1 network. Upon emergency call initiation, ECC A (the "correct" ECC based on the caller being located within the ECC A jurisdictional area) displays a location indicator 201 within its map view 124 on its EDMS GUI. The ECC A may also receive the mobile device telephone number which may display an entry 203A in its call queue, and may display as a popup 203B along with the location indicator 201. However, ECC does not receive the emergency call. The initial emergency call queue entry 203A and location indicator 201 on the EDMS GUI 123 may be displayed in various distinct colors, font styles, or using distinctive icons such that the call takers understand each entry in the queue and can distinguish between incoming calls and calls that have been placed but not yet received. Therefore, the call take at ECC A would understand from that the call has not yet come in to ECC A.

At ECC B, which is the alternative ECC and does not have jurisdiction of the geographic area where the caller is located, the wireless network, or the 9-1-1 network, has routed the emergency call and ECC B receives the ANI data for the mobile device (i.e. the caller ID for telephone number 650-555-2399). At that point, the ECC B performs an ALI request to receive ALI data which is a standard ECC telephony operation. The connectivity device 130, receives the ANI/ALI data from the ECC B CPE 101, and sends the ANI/ALI data to the EDMS 100. The connectivity device 130 also receives audio data of the conversation between the caller and the ECC B call taker from the ECC B CPE 101 SPAN port 105. The EDMS 100 receives the ANI/ALI data and already has the mobile device telephone number and device hybrid location. Therefore, the EDMS 100 is aware that the emergency call was placed from the mobile device with telephone number 650-555-2399 and that the mobile device is actually located in the jurisdiction of ECC A. The voice processing module 142 begins creating the call transcript 111 and provides it to ECC A. The call transcript 111 can be displayed within the ECC A EDMS GUI 123 as shown in FIG. 2.

As the EDMS 100 detects calls arriving at each ECC via data it receives from the connectivity device 130, or via the data it receives via the mobile location servers 115, the EDMS 100 can change the location indicator, and call queue entry color, font style, or icon, etc. for queue entries related to calls that have been received by the ECC, calls made but not yet routed or received at the ECC, and calls known to have been rerouted to another ECC, such that the change appears on the EDMS GUI 123. In one example related to FIG. 2, the call location indicator 201 and call queue entry 203A may be red to indicate that the call has been routed to another ECC (i.e. ECC B). At ECC B, the location indicator 209 and call queue entry 207A may be yellow to indicate that the call was received by belongs to a different ECC jurisdiction (ECC A). In some embodiments, an additional popup like popup 207B may display the ECC A identifier or the ECC A identifier may in included in popup 207B, or the like, etc., to notify ECC B that the emergency call emanated from the jurisdiction of ECC A. Likewise, ECC A may include the ECC B identifier in popup 203B to notify ECC A that the emergency call was received and answered by ECC B. The ECC B identifier may also be included in the transcript 111 and the transcript 111 itself may serve as the notification that another ECC has received and answered the emergency call. In another implementation, the EDMS 100 can create a separate emergency call queue on the EDMS GUI 123 for emergency calls routed to another alternative ECC. The voice processing module 142 may also be operative to provide language translation, and may also provide a summary of the conversation using generative artificial intelligence (gen-AI). Therefore, the transcript 111 may include a translation and a conversation summary.

The map view provided by the EDMS GUI 123 may display location indicators for devices from which emergency calls have emanated before completion of the emergency call routing to the ECC differently than location indicators for emergency calls that have been received at the ECC. The EDMS GUI 123 may display location indicators in various distinct colors, using different font styles, or using distinctive icons such that the call takers understand each location point and can distinguish between incoming call locations and calls that have been placed from a location but not yet received at the ECC, or rerouted to another ECC.

The connectivity device 130 may send data to the EDMS 100 in a streaming manner, or as a data push operation, as the data is obtained by the connectivity device 130. In response to receiving data from the connectivity device 130 whether sent in a data stream, as a push operation, the EDMS 100 provides emergency data which includes, but is not limited to, augmented device location information and other additional data.

For handling data, the connectivity device 130 may use RESTful API HTTP methods such as GET, POST, PUT, and DELETE. However, the connectivity device 130 may use the POST method to send emergency data 170, which may include ANI/ALI data, voice processing data, or both, or other data to the EDMS 100 to create or update a resource at a cloud-based data endpoint in the VPC network 140. When the connectivity device 130 sends a POST request to the cloud-based data endpoint, it will normally be accompanied by a payload of data that is used to create or update the resource on the data endpoint. In some embodiments, the data may be in the form of a JSON object. In some embodiment, the JSON object may be an EIDO ("Emergency Incident Data Object"). In some embodiments, the data may be in XML format. The connectivity device 130 may also use the PUT method to update an existing resource on the data endpoint. For example, the data endpoint may send ANI/ALI updates via PUT when a mobile device in an emergency call changes locations. The EDMS 100 may use any of the RESTful API HTTP methods such as GET, POST, PUT, and DELETE to handle data with the connectivity device 130, and also to provide data 170 to the EDMS GUI 123 displayed on the ECC workstation 119.

The connectivity device 130 will always receive ANI/ALI data from a CPE 101 functional element when an emergency call is received by the ECC. The EDMS 100 however receives accurate location data, such as mobile generated hybrid location, from the mobile location servers 115 which receive the location data directly from the mobile devices that place emergency calls, via internet connectivity to the mobile devices. Information related to the caller may also be obtained from the additional data servers 116. Therefore, the EDMS GUI 123 will always display the most current and accurate location information of each emergency call that has come into the CPE 101, or that should have been received. The connectivity device 130 may also be operative to obtain call meta data for calls received at and ECC as well as CDR (call detail record) information. This obtained data may be displayed to one or more ECCs with each ECC's respective EDMS GUI 123.

FIG. 3 is a flowchart of a method of operation of an EDMS for handling a misrouted emergency call from a mobile device in accordance with an embodiment corresponding to FIG. 2. At operation 301, an emergency call is initiated by a mobile device that is located within the jurisdictional boundary of a first ECC. Referring to FIG. 2, the first ECC corresponds to "ECC A." Based on the location of the cellular tower used by the mobile device to place the emergency call (which may be due to RF coverage issues or due to a network disruption), at operation 303, the wireless network routes the emergency call to a second ECC within the wireless call routing area associated with the cellular tower. The second ECC is "ECC B" with respect to FIG. 2. At operation 305, the EDMS 100 receives location information, and possibly other information, from the mobile device via Internet connectivity. Upon initiation of the emergency call, the mobile device sends its hybrid location data, such as, but not limited to, Android Mobile Location (AML) data, Android Emergency Location Service (ELS) data, and Hybridized Emergency Location (HELO) data provided by iOS™ devices, or the like, etc., to one of the mobile location servers 115. Any data that is sent to the mobile location servers 315 is obtained by the EDMS 100 and this data is separate from the wireless telecommunication network. At operation 307, the EDMS 100 provides the emergency data to the first ECC (ECC A) because the EDMS 100 determines that the mobile device is located within the ECC A jurisdictional boundary. The EDMS 100 may include a geofence database that has polygonal boundary coordinates of each ECC defining each ECC's jurisdictional boundary. The cloud-based application 160 provides each ECC with a jurisdictional view on the map view 124, so that ECC operators can see visually emergency calls that are being placed within their respective jurisdiction. The map view 124 however can be panned (or scrolled) to the right, left, up, and down, and can be zoomed in to specific regions as needed by the operator, to view regions outside the jurisdiction. The outside regions may show location indicators for emergency calls however these location indicators may be greyed out to indicate that they are not relevant. User settings may allow either showing, or not showing, emergency calls outside the relevant jurisdiction.

Returning to FIG. 3, at operation 309, because the call is routed by the wireless telecommunication network to ECC B (i.e. the second ECC), a call taker at ECC B receives and answers the emergency call. The ECC B system sends a query to the ANI/ALI database which is a request for location information. The ECC B call taker, as shown at operation 311, begins verbally gathering information from the caller. At operation 313, the connectivity device 130, which is physically installed and located at the ECC B premises, obtains voice data of the conversation and sends the voice data to the EDMS 100. In some embodiments, the voice processing module 142 within VPC 140 will perform speech-to-text conversion and word recognition to produce a transcript 111. Word recognition is used to determine, among other things, the type of incident (police, fire, medical, etc.), the severity, circumstances, etc. In some embodiments, the voice processing module 142 is executed by processor 151 within the EDM server 150. The speech-to-text conversion and word recognition is performed as shown at operation 315.

Figure 4:
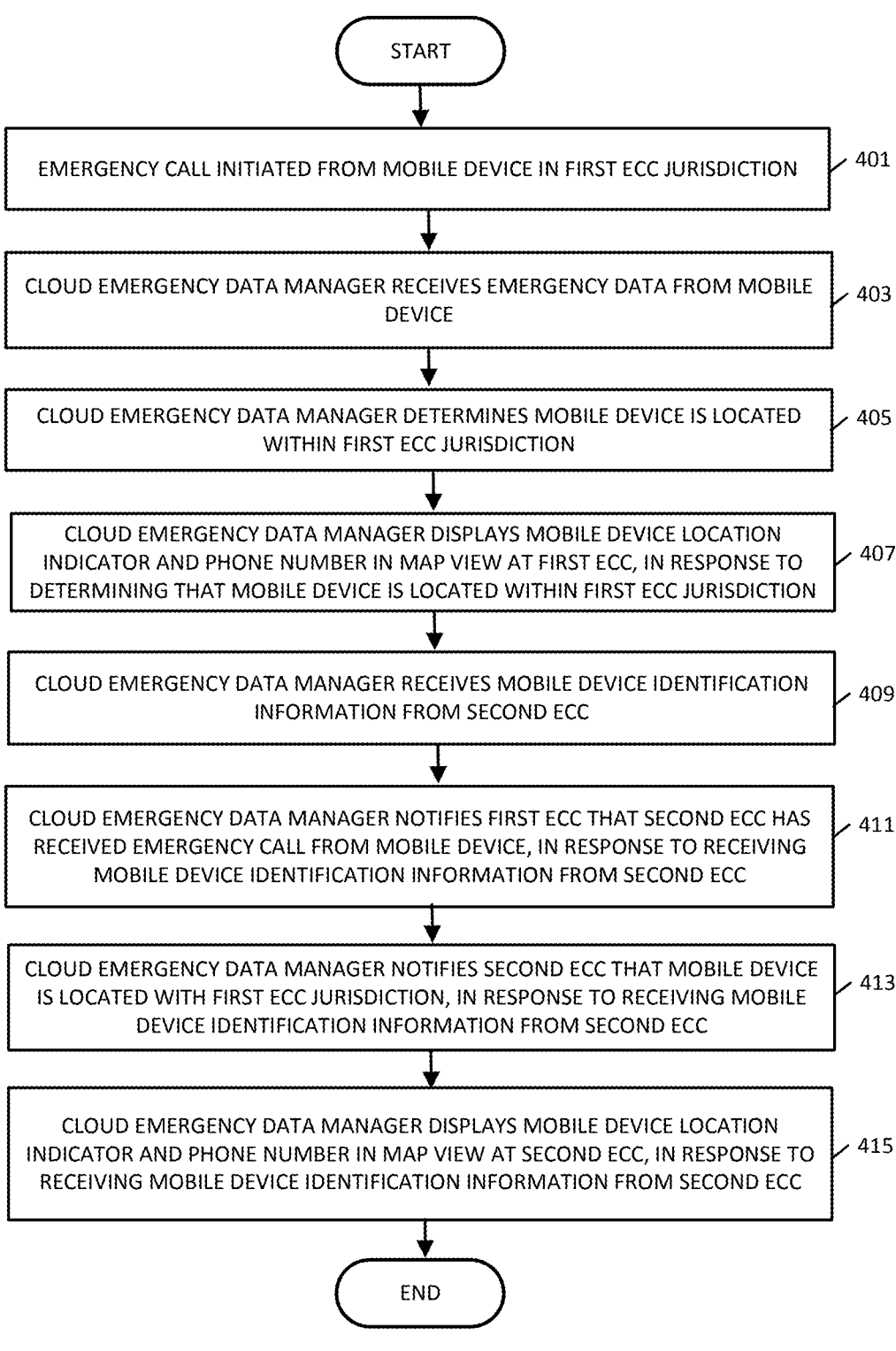
FIG. 4 is a flowchart of a method of operation of an EDMS for handling a rerouted emergency call from a mobile device in accordance with an embodiment.

FIG. 4 is a flowchart of a method of operation of an EDMS for handling a rerouted emergency call from a mobile device in accordance with an embodiment. At operation 401, an emergency call is initiated by a mobile device that is located within the jurisdictional boundary of a first ECC. At operation 403, the EDMS 100 receives emergency data, which included location information and possibly other information, from the mobile device. As described with respect to FIG. 3, the emergency data includes hybrid location data, such as, but not limited to, Android Mobile Location (AML) data, Android Emergency Location Service (ELS) data, and Hybridized Emergency Location (HELO) data provided by iOS™ devices, or the like, etc. At operation 405, the EDMS 100 determines that the mobile device is located within the jurisdiction of the first ECC. At operation 407 the EDMS 100, via the cloud-based application 160, displays a mobile device location indicator and the mobile device telephone number in the map view within the EDMS GUI 123 at the first ECC, in response to determining that the mobile device is located within the jurisdictional boundaries of the first ECC. At operation 409, receives mobile device identification information from the second ECC. For example, the connectivity device 130 receives ANI/ALI data in response to an ANI/ALI database query being made by a functional element of the second ECC, and sends the ANI/ALI data to the EDMS 100. At operation 411, the EDMS 100, via the cloud-based application 160, notifies the first ECC that the second ECC has received the emergency call from the mobile device, in response to receiving the ANI/ALI data (i.e. receiving mobile device identification information) from the second ECC. At operation 413, the EDMS 100, via the cloud-based application 160, notifies the second ECC that the mobile device is located with the first ECC jurisdiction, in response to receiving the ANI/ALI data from the second ECC. At operation 415 the EDMS 100, via the cloud-based application 160, displays a mobile device location indicator and the mobile device telephone number in the map view within the EDMS GUI 123 at the second ECC, in response to receiving the ANI/ALI data from the second ECC.

Figure 5:
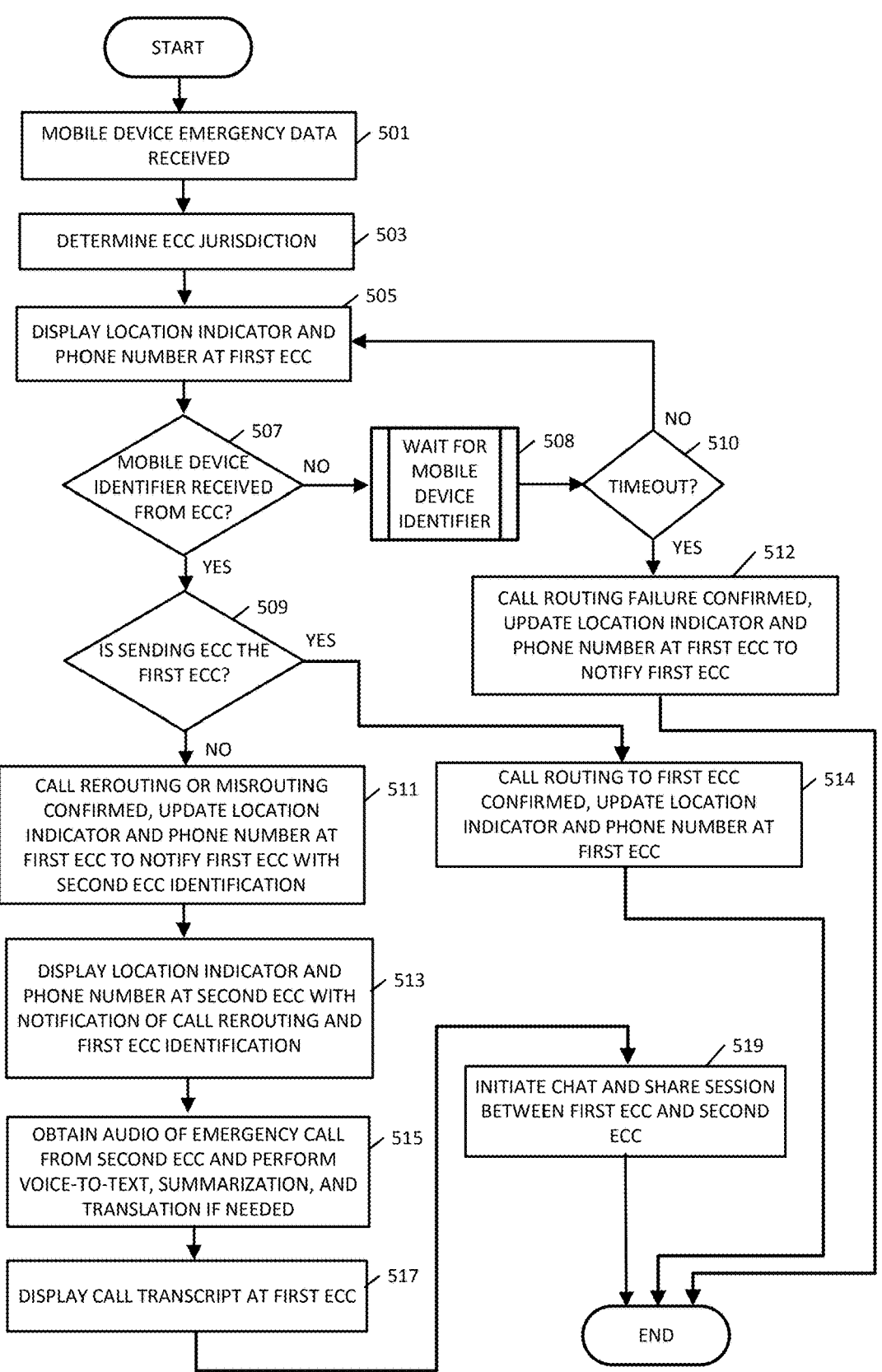
FIG. 5 is a flowchart of a method of operation of an EDMS for handling a rerouted emergency call from a mobile device in accordance with an embodiment.

FIG. 5 is a flowchart of a method of operation of an EDMS for handling a rerouted emergency call from a mobile device in accordance with an embodiment. At operation 501, the EDMS 100 receives emergency data, including location information and possibly other information, from a mobile device that initiated an emergency call from within the jurisdictional boundary of a first ECC. As described with respect to FIG. 3, the emergency data includes hybrid location data, such as, but not limited to, Android Mobile Location (AML) data, Android Emergency Location Service (ELS) data, and Hybridized Emergency Location (HELO) data provided by iOS™ devices, or the like, etc. At operation 503, the EDMS 100 determines that the mobile device is located within the jurisdiction of the first ECC. At operation 505 the EDMS 100, via the cloud-based application 160, displays a mobile device location indicator and the mobile device telephone number in the map view 124 within the EDMS GUI 123 at the first ECC. At decision 507, if a mobile device identifier is not received from the first ECC, the EDMS 100 waits as shown in process 508 until a timeout 510. If the timeout 510 occurs then at operation 512, the EDMS 100 determines that call routing of the emergency call has failed and notifies the first ECC. The notification may be a text notification such as a popup, or may be (or include) updating the location indicator and mobile device telephone number. For example, the location indicator and telephone number may be turned red, or red and flashing, or the like, etc., to indicate that the emergency call routing has failed.

However, if a mobile device identifier is received at decision 507, then at decision 509 the EDMS 100 determines whether the ECC that sent the mobile device identifier is the first ECC (e.g. the ECC having jurisdiction based on the caller's location). If yes, then the EDMS 100 determines that emergency call routing to the first ECC has occurred and may update the location indicator and telephone number at the first ECC.

However, if at decision 509 the sending ECC is not the first ECC as expected, then at operation 511 the EDMS 100 confirms that the emergency call has been rerouted or misrouted to an alternative second ECC, and updates the location indicator and phone number at the first ECC (or sends a text or popup window, or all of these) to notify the first ECC and provide the first ECC with the identification of the second ECC that received the emergency call. At operation 513, the EDMS 100 displays the location indicator and mobile device telephone number at the second ECC, with a notification that the call was rerouted or misrouted from the first ECC, and that the caller is located within the jurisdiction of the first ECC, providing the identification of the first ECC. The EDMS 100 displays the call transcript 111, from the conversation of the caller with the second ECC, at the first ECC via the EDMS GUI 123 at the first ECC. At operation 519, the EDMS 100 may also initiate a chat and share session between the first ECC and the second ECC. For example, with reference to FIG. 2, a chat window 211A may be displayed at ECC A corresponding to a chat window 211B displayed at ECC B. The respective operators may then use the chat feature to coordinate a response to the emergency.

The apparatuses, systems, and methods described above are also useful during network outages and natural disasters, or for multi-agency coordination. For example, during a network outage, two or more ECCs may be unable to receive emergency calls. However, a third ECC may be routed the emergency calls due to the outage. The third ECC in this situation would receive notifications of which ECC jurisdiction each emergency call belongs to, and the ECC having jurisdiction would receive notification of that the emergency calls were placed, and being received and answered by the third ECC. The ECCs may then coordinate responses using the apparatuses, systems, and methods described above.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:

receiving, by a cloud server, emergency data from a mobile device that placed an emergency call;

determining, by the cloud server, that the mobile device is located within the jurisdiction of a first ECC, in response to receiving the emergency data;

determining, by the cloud server, that the emergency call has been rerouted to a second ECC;

notifying, by the cloud server, the first ECC that the emergency call was rerouted to the second ECC; and notifying the second ECC that the emergency call was placed from within the jurisdictional boundaries of the first ECC.

2. The method of claim 1, further comprising:

receiving mobile device identification data from the second ECC for the mobile device; and determining that the emergency call has been rerouted to the second ECC in response to receiving the mobile device identification data from the second ECC for the mobile device.

3. The method of claim 2, wherein receiving mobile device identification data from the second ECC for the mobile device, comprises:

obtaining ANI/ALI (Automatic Number Identification/Automatic Location Identification) data via a connection between a connectivity device located at the second ECC and an ECC functional element of the second ECC; and sending the ANI/ALI data to the cloud server from the connectivity device.

4. The method of claim 1, further comprising:

receiving audio data corresponding to the emergency call received at the second ECC.

5. The method of claim 4, further comprising:

producing a transcript of the emergency call by performing speech-to-text conversion of the audio data corresponding to the emergency call received at the second ECC; and providing the transcript to the first ECC.

6. The method of claim 1, further comprising:

receiving audio data corresponding to the emergency call received at the second ECC, in response to receiving mobile device identification data from the second ECC for the mobile device.

7. The method of claim 1, wherein notifying the second ECC that the emergency call was placed from within the jurisdictional boundaries of the first ECC, comprises:

providing identification information for the first ECC to the second ECC.

8. The method of claim 1, wherein notifying the first ECC that the emergency call was rerouted to the second ECC, comprises:

providing identification information for the second ECC to the first ECC.

9. A system comprising:

a cloud server, operative to establish a connection with at least two emergency communication centers (ECCs), the cloud server comprising at least one process and non-volatile, non-transitory memory, operatively coupled to the processor, the processor operative to:

receive emergency data from a mobile device that placed an emergency call;

determine that the mobile device is located within a jurisdiction of a first ECC, in response to receiving the emergency data;

determine that the emergency call has been rerouted to a second ECC;

notify the first ECC that the emergency call was rerouted to the second ECC; and notify the second ECC that the emergency call was placed from within the jurisdictional boundaries of the first ECC.

10. The system of claim 9, further comprising:

a connectivity device, comprising at least one processor and a non-volatile, non-transitory memory, operatively coupled to the processor, the connectivity device located at an emergency communication center (ECC), operatively coupled to an ECC functional element, and to the cloud server, the connectivity device operative to:

receive ECC emergency data from the ECC functional element and send the emergency data to the cloud server.

11. The system of claim 9, wherein the processor is further operative to:

receive mobile device identification data from the second ECC for the mobile device; and determine that the emergency call has been rerouted to the second ECC in response to receiving the mobile device identification data from the second ECC for the mobile device.

12. The system of claim 9, wherein the processor is further operative to:

receive audio data corresponding to the emergency call received at the second ECC.

13. The system of claim 9, wherein the processor is further operative to:

produce a transcript of the emergency call by performing speech-to-text conversion of the audio data corresponding to the emergency call received at the second ECC; and provide the transcript to the first ECC.

14. The system of claim 9, wherein the processor is further operative to:

receive audio data corresponding to the emergency call received at the second ECC, in response to receiving mobile device identification data from the second ECC for the mobile device.

15. The system of claim 9, further comprising:

a connectivity device, comprising at least one processor and a non-volatile, non-transitory memory, operatively coupled to the processor, the connectivity device located at an emergency communication center (ECC), operatively coupled to an ECC functional element, and to the cloud server, the connectivity device operative to receive the mobile device identification data from the second ECC for the mobile device, by:

obtaining ANI/ALI (Automatic Number Identification/ Automatic Location Identification) data via a connection between the connectivity device located at the second ECC and an ECC functional element of the second ECC; and send the ANI/ALI data to the cloud server.

16. The system of claim 9, wherein the processor is further operative to notify the second ECC that the emergency call was placed from within the jurisdictional boundaries of the first ECC, by:

providing identification information for the first ECC to the second ECC.

17. The system of claim 9, wherein the processor is further operative to notify the first ECC that the emergency call was rerouted to the second ECC, by:

providing identification information for the second ECC to the first ECC.

18. A system comprising:

a cloud server, operative to establish a connection with at least two emergency communication centers (ECCs), the cloud server comprising at least one process and non-volatile, non-transitory memory, operatively coupled to the processor, the processor operative to:

receive emergency data from a mobile device that placed an emergency call;

determine that the mobile device is located within a jurisdiction of a first ECC, in response to receiving the emergency data;

determine that the emergency call has been rerouted to a second ECC;

notify the first ECC that the emergency call was rerouted to the second ECC; and open a chat session between the first ECC and the second ECC.

19. A system comprising:

a cloud server, operative to establish a connection with at least two emergency communication centers (ECCs), the cloud server comprising at least one process and non-volatile, non-transitory memory, operatively coupled to the processor, the processor operative to:

receive emergency data from a mobile device that placed an emergency call using a wireless telecommunication network;

notify an ECC that the emergency call was placed from within the jurisdictional boundaries of the ECC;

determine that the emergency call has not been routed to the ECC or any other ECC by the wireless telecommunication network;

notify the ECC that the emergency call was not routed; and establish a chat session between a first ECC and a second ECC, the chat session comprising a data sharing connection.

20. The system of claim 19, wherein the processor is further operative to:

determine that the mobile device is located within the jurisdiction of a first ECC, in response to receiving the emergency data.

* * * * *